United States Patent
Stuck

(10) Patent No.: US 11,190,529 B2
(45) Date of Patent: Nov. 30, 2021

(54) METHOD AND SYSTEM FOR ON-BOARD CYBER (INFORMATION) SECURITY APPLIANCE AND APPLICATIONS TO DETECT, MANAGE AND OPTIONALLY MITIGATE CYBER SECURITY EVENTS AND /OR ANOMALIES ON AIRCRAFT NETWORKS

(71) Applicant: Eric Edward Stuck, Newnan, GA (US)

(72) Inventor: Eric Edward Stuck, Newnan, GA (US)

(*) Notice: Subject to any disclaimer, the term of this patent is extended or adjusted under 35 U.S.C. 154(b) by 404 days.

(21) Appl. No.: 15/822,086

(22) Filed: Nov. 24, 2017

(65) Prior Publication Data

US 2021/0320928 A1 Oct. 14, 2021

(51) Int. Cl.
  *H04L 29/06* (2006.01)
(52) U.S. Cl.
  CPC ...... *H04L 63/1416* (2013.01); *H04L 63/1441* (2013.01); *H04L 63/1425* (2013.01); *H04L 63/1433* (2013.01)

(58) Field of Classification Search
  USPC ...................................................... 713/166
  See application file for complete search history.

(56) References Cited

U.S. PATENT DOCUMENTS

| | | | | |
|---|---|---|---|---|
| 5,594,414 A * | 1/1997 | Namngani | ............. | G01P 15/00 340/436 |
| 6,278,913 B1 * | 8/2001 | Jiang | ................... | G07C 5/0858 244/158.1 |
| 6,385,513 B1 * | 5/2002 | Murray | ................ | G08G 5/0026 701/14 |
| 8,350,725 B2 * | 1/2013 | Leclercq | ........... | H04B 7/18506 340/945 |
| 8,881,288 B1 * | 11/2014 | Levy | ................... | H04L 63/1408 726/25 |
| 8,949,668 B2 * | 2/2015 | Hanks | ................. | H04L 63/1416 714/26 |
| 9,938,019 B2 * | 4/2018 | Floyd | ................. | B64D 45/0015 |
| 10,166,916 B2 * | 1/2019 | Bernico | ............... | G08G 1/0141 |
| 10,248,742 B2 * | 4/2019 | Desell | .................... | G01C 23/00 |
| 2003/0027551 A1 * | 2/2003 | Rockwell | ......... | B64D 11/00155 455/410 |
| 2004/0056770 A1 * | 3/2004 | Metcalf | ............. | G08B 13/1966 340/574 |
| 2008/0086554 A1 * | 4/2008 | Royalty | ............ | B64D 45/0063 709/224 |
| 2009/0189785 A1 * | 7/2009 | Kravitz | ................... | F41G 7/224 340/945 |
| 2011/0099371 A1 * | 4/2011 | Roy | .................... | H04L 63/0823 713/168 |
| 2011/0187561 A1 * | 8/2011 | Botargues | ............ | G01S 13/933 340/961 |

(Continued)

*Primary Examiner* — Badri Narayanan Champakesan
(74) *Attorney, Agent, or Firm* — Seed Intellectual Property Law Group LLP

(57) ABSTRACT

A system, method and computer readable and executable media for detecting, alerting, managing and optionally mitigating cyber security events on an aircraft's networks using an on-board cyber security appliance and applications that monitors and detects cyber security events in real time. A software selectable cyber security agent within the cyber security appliance mitigates (if enabled) the effects of a cyber security events and/or anomalies on the aircrafts networks while the aircraft is in-flight and/or on the ground.

14 Claims, 3 Drawing Sheets

(56) References Cited

U.S. PATENT DOCUMENTS

| | | | |
|---|---|---|---|
| 2013/0242864 A1* | 9/2013 | Vermande | H04B 7/18506 370/328 |
| 2015/0327307 A1* | 11/2015 | Randrianasolo | H04W 12/35 370/329 |
| 2016/0012445 A1* | 1/2016 | Villa-Real | G06Q 20/353 705/44 |
| 2016/0065603 A1* | 3/2016 | Dekel | H04L 63/14 726/23 |
| 2016/0105326 A1* | 4/2016 | Smart | H04L 41/12 370/242 |
| 2017/0041331 A1* | 2/2017 | Craig | H04L 63/1441 |
| 2017/0134400 A1* | 5/2017 | Nguyen | H04L 63/1416 |
| 2018/0025157 A1* | 1/2018 | Titonis | G06N 20/00 726/24 |
| 2018/0181144 A1* | 6/2018 | Steinmann | G05D 1/104 |
| 2018/0315323 A1* | 11/2018 | Winkler | G08G 5/0095 |
| 2018/0348250 A1* | 12/2018 | Higgins | G01P 5/00 |
| 2018/0373866 A1* | 12/2018 | Sweeney | H04L 63/1425 |
| 2019/0014371 A1* | 1/2019 | Couleaud | H04N 21/2146 |
| 2019/0087745 A1* | 3/2019 | Kurian | G06F 9/542 |
| 2019/0098506 A1* | 3/2019 | Avila | H04L 63/105 |
| 2019/0102689 A1* | 4/2019 | Lassoued | G07C 5/0841 |
| 2019/0104138 A1* | 4/2019 | Storms | H04L 63/1425 |
| 2019/0122143 A1* | 4/2019 | Ayyagari | G06N 20/00 |
| 2019/0356713 A1* | 11/2019 | Demange | H04N 21/4332 |

\* cited by examiner

METHOD AND SYSTEM FOR ON-BOARD CYBER (INFORMATION) SECURITY APPLIANCE AND APPLICATIONS TO DETECT, MANAGE AND OPTIONALLY MITIGATE CYBER SECURITY EVENTS AND /OR ANOMALIES ON AIRCRAFT NETWORKS

FIELD OF TECHNOLOGY

The present disclosure is in the general field of cyber (information) Security Information and Event Management (SIEM) systems using artificial intelligence/machine intelligence (AI/MI) and advanced machine learning for detecting, alerting and protecting an aircraft's networks from cyber security events while in in-flight and/or on the ground.

BACKGROUND

The aviation industry historically used a mix of Aeronautical Radio Inc. (ARINC) standards and proprietary data bus architectures held by the major aircraft electronics (Avionics) Original Equipment Manufacturers (OEM). However, lack of interoperability and slow data bus speeds did not keep pace with ethernet data bus speeds and commonality of hardware and protocols. Therefore, the avionics OEMs turned to ethernet hardware and protocols creating the Avionics Full Duplex Switched Ethernet (AFDX)/ARINC 664 definitions, standards and protocol stack.

The creation of AFDX/ARINC 664 allowed for rapid advancements in avionics design and ushered in safety enhancements like synthetic vision at significantly lower cost and development cycles than previous avionics architectures. Basing on standards from the IEEE 802.3 committee (commonly known as Ethernet) allows for commercial off-the-shelf hardware to reduce costs and development time. AFDX is one implementation of deterministic Ethernet defined by ARINC Specification 664 Part 7. AFDX was developed by Airbus Industries initially for the A380 aircraft model.

However, using Internet Protocols (IP), Universal Datagram Protocol (UDP) and optionally Transmission Control Protocol (TCP), plus other TCP/IP protocols and services exposes aircraft networks to vulnerabilities that did not exist previously. This has led to a new field, developing methods and systems to detect, alert and protect AFDX/ARINC 664 networks on-board modern aircraft from cyber security events and/or anomalies both in-flight and/or on the ground.

In April of 2016 Sen. Edward J. Mat key [D-MA] Introduced bill S.2764, which was read twice during the 114$^{th}$ session of Congress. The bill is the first effort by US law makers to address the growing threat to aviation safety due to the introduction AFDX/ARINC 664 networks, protocols and services on-board aircraft. One report states there will be an estimated 65,000 aircraft worldwide in operation by 2030 running AFDX/ARINC 664. The bill addresses cyber security requirements for the following areas; air carrier operating and production certificates, annual reporting of cyber-attacks on aircraft systems and the maintenance and ground support systems for aircraft, plus managing cyber security risks of consumer communication equipment such as Satellite Communication (SATCOM) terminals. Additionally, perpetual periodic evaluation of the aircraft network security and the maintenance and ground support systems for aircraft will most likely be required, like many other aircraft and ground support systems requiring annual or biennial testing, evaluation and recertification by the Federal Aviation Administration (FAA) and the International Civil Aviation Organization (ICAO) member countries.

Another feature of the present disclosure's system and method is the detection of network events that are not related to a cyber-attack, but rather arise from anomalies induced by other unintentional interactions among devices on the aircraft's networks. One example of this type of anomaly is the FAA Airworthiness Directive (AD) 2015-NM-128-AD which affects certain Bombardier BD-700-1A10 and BD-700-1A11 (Global Express models). This AD spells out that the network interface of the Information Management System 6000 unit and the Cabin Entertainment System network could affect the Aircraft Control Domain and result in the transmission of misleading navigational information to the flight crew. The AD further states this could adversely affect the ability of the flight crew to maintain the safe flight and landing of the aircraft. The system and method of the present disclosure will have the ability to detect and warn the flight crew of such anomalous network activity, potentially intervein by quarantining the activity and most certainly discover the source of the anomaly much sooner than is currently available to flight crews, maintenance personnel and engineers.

One prior art attempts to address cyber security events on aircraft networks by incorporating the use of a ground based twin of the aircraft networks and using a data link to send suspicious activities to a ground based aircraft twin to run in a sandbox, evaluate the results, then decide to run or not run on-board the aircraft. The major deficiency in this type of approach is twofold; the potentially critical time consumed by data link and sandbox activities and the fact that data links and SATCOM terminals in particular are notoriously vulnerable to cyber-attack. As reported in a Technical White Paper from IO Active in 2014, these vulnerabilities have the potential to allow a malicious actor to intercept, manipulate, or block communications, and in some cases, to remotely take control of the physical SATCOM device.

Therefore, the best method for detecting, warning and optionally mitigating cyber security events on-board an aircraft is by using a self-contained on-board cyber security appliance and applications running artificial intelligence/machine intelligence (AI/MI) and advanced machine learning to alert the flight crew of detected cyber security events and anomalies on an aircraft's networks and allow the crew to make the ultimate decision regarding corrective actions and execution or not of suspicious commands and/or network activities.

SUMMARY OF THE INVENTION

Considering the above background information and prior art, the present disclosure is intended to provide a system and method, using existing or new hardware and artificial intelligence/machine intelligence (AI/MI) applications and advanced machine learning for detecting, alerting and optionally mitigating cyber security events on an aircraft's networks in real-time.

It is a more specific objective of the invention to provide an on-board self-contained system and method for detecting, alerting and optionally mitigating cyber security events and network anomalies on aircraft networks without the need for any form of data link or off aircraft transmissions or the need to receive data from the ground. Additionally, there is no need for a human operator on the ground as the artificial intelligence/machine intelligence (AI/MI) engine within the system provides that method and function. Additionally, the flight crew will be alerted via visual and aural annunciations and the flight crew will make the ultimate decision regard suggested corrective actions by the aircraft network cyber security appliance and applications.

Monitoring of the aircraft's networks will be accomplished via network taps installed at each switch or optionally installing a software or firmware agent on each switch that copies all network traffic and sends the data in real time to the network interface card(s) of System 200 running the artificial intelligence/machine intelligence (AI/MI) applications and algorithms.

Other objectives and features of the present invention will become apparent from the following detailed description considered in conjunction with the accompanying drawing. It is to be understood, however, that the drawings are designed solely for purposes of illustration and not as a definition of the limits of the invention, for which reference should be logically made to the claims. It should be further understood that the drawings are not necessarily drawn to scale and that, unless otherwise indicated, it is merely intended to conceptually illustrate the structures and procedures described herein.

DETAILED DESCRIPTION

Figure 1:
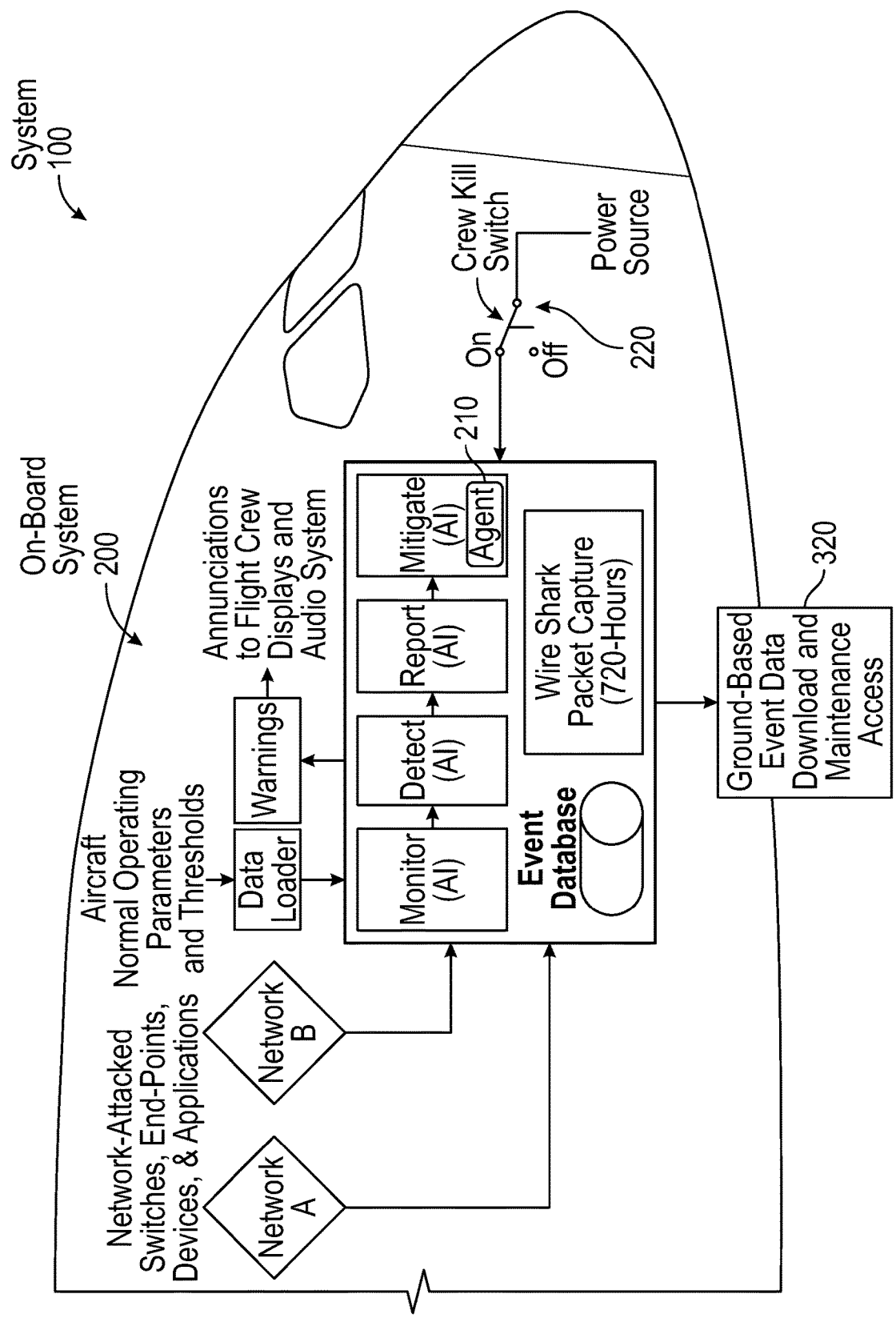
FIG. 1 presents System 100 (aircraft), System 200 (cyber security appliance and applications) and System 310 (ground based event data download)

The present disclosure will be described in greater detail hereafter along with references to accompanying drawings in an effort to fully convey the scope of the disclosure to those skilled in the art.

This example implementation of the present disclosure will use aviation references, however, it should be understood that applications of the present disclosure may have uses in industries other than aviation that use similar IP based network systems. For example, automobiles, rolling stock and marine vessels, although an aviation implementation will be used in this example. It should, however, be understood that other aviation implementations may be developed in the future and this is but one example of an aviation implementation of the present disclosure described herein.

Furthermore, the present disclosure references AFDX/ARINC 664, which are the current standards used in modern aircraft avionics designs. However, the present disclosure will migrate to future iterations or AFDX/ARINC 664 and the like—for example Micro AFDX architecture and protocol stack currently under development.

Prior to System 200 being installed and integrated into System 100 aircraft networks, normal aircraft operating parameters and thresholds are loaded into System 200 per aircraft model and/or per avionics system and aircraft configuration. This action provides System 200 with the personality of the aircraft it is installed upon and avionics systems and networks it is integrated into. Additionally, System 200 will be loaded with the aircraft's network map to include all switches, end points, access points, etc. providing a base line of what devices normally communicate with each other, their frequency, and during what phases of flight.

At the heart of the present disclosure is the artificial intelligence/machine intelligence (AI/MI) engine with advanced machine learning. This provides the capability to continue to learn a sense of "normal" and therefore what is abnormal and should be flagged, warn the flight crew and/or maintenance personnel for further investigation. Past the initial loading of data described in the previous paragraph the system will go through a learning curve both in-flight and on the ground to validate the aircraft personality and learn specifically which devices communicate with each other, at what frequency and during what phase of flight and/or when the aircraft is on the ground. Therefore, the software selectable quarantine function will not initially be available, but will become available after sufficient data is collected and integrated into the artificial intelligence/machine intelligence (MI/AI) engine, applications and algorithms.

System 200 will operate in two distinct modes; Mode 1 aircraft Weight on Wheels (WoW) is positive equals Ground Mode where System 200 gives extra scrutiny to any network activities normally associated with ground operations. These include, but are not limited to; data upload events, data download and system maintenance events, WIFI access point(s) activities and any switch, endpoint or network device that shows up on the networks having a new Media Access Control (MAC) address indicating a unit was removed and replaced with another like unit. Mode 2 aircraft Weight on Wheels (WoW) is negative equals Air Mode where System 200 gives extra scrutiny to any network activities having to do with safety of flight and aircraft control. These include, but are not limited to; flight control commands, engine thrust change commands, pressurization change commands, outflow valve operational commands, navigational change commands, sudden navigational sensor position changes in excess of normal and any anomalous and/or unexpected network activities such as end points or network devices attempting to communicate in an unusual fashion or any new device suddenly showing up on the networks.

Figure 2:
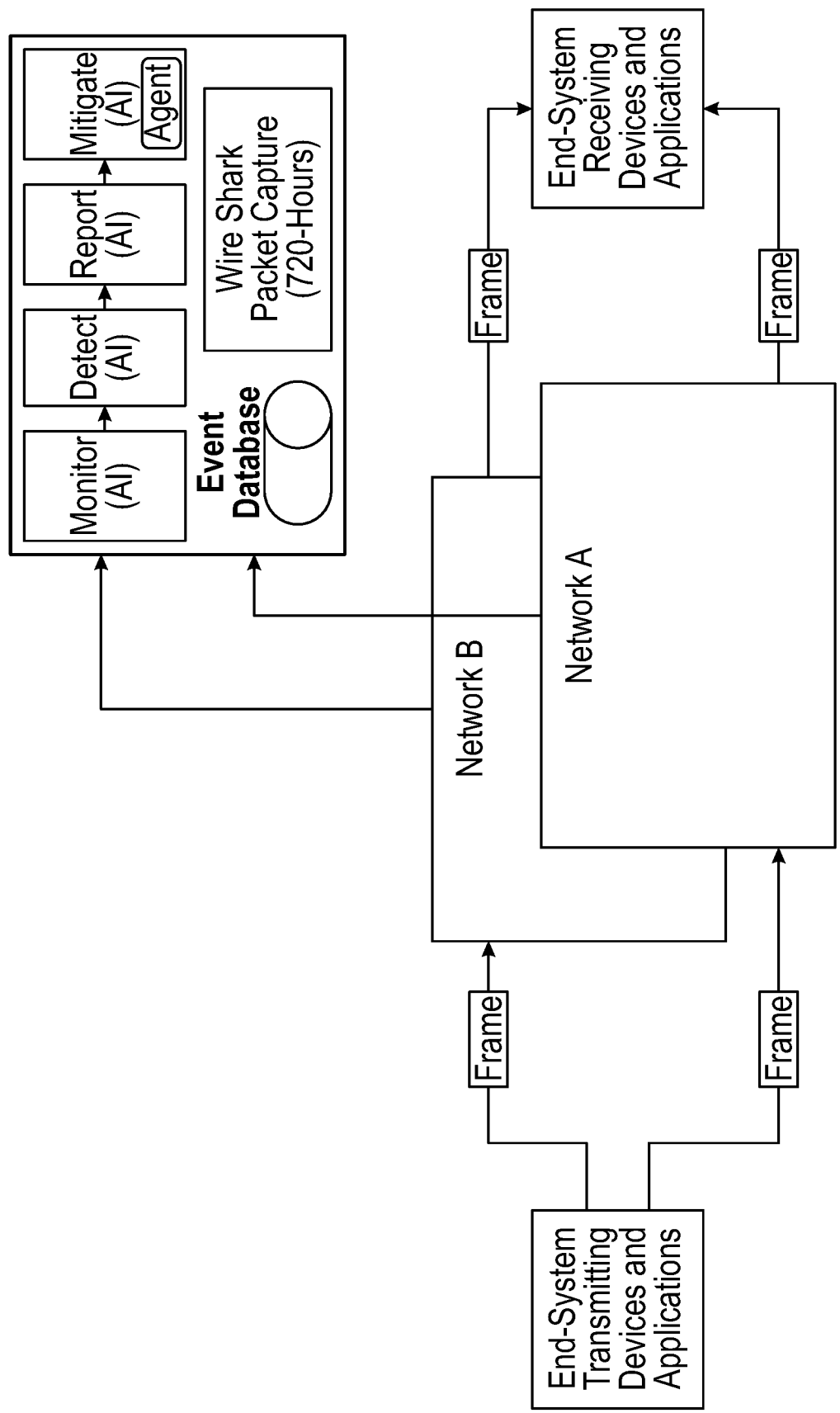
FIG. 2 Depiction of end systems transmitting and receiving frames of packets through switches on Network A and Network B and System 200 receiving all network traffic on both networks.

Referencing FIGS. 1 and 2, following is a description of the functionality of the cyber security appliance and applications as it relates to System 100 while in-flight and/or on the ground. When the aircraft electronics of System 100 are powered on and System 200 is also powered on, System 200 will monitor the cyber security health and status of System 100 on both Network A and Network B and follow the logic tree presented in FIG. 2, Step 402.

When a cyber security event or network anomaly is detected, Step 404 first determines if normal operating parameters or pre-set thresholds have been exceeded and if so assigns a severity level to the event in Step 406. System 200 then analyses the event or anomaly using artificial intelligence/machine intelligence (AI/MI) and determines if the event could affect safety of flight in Step 410. If yes and the software selectable quarantine function of Module 210 is enabled, System 200, Step 414 will quarantine the detected cyber security event or network anomaly, Step 416 then warns the flight crew via visual annunciations on the primary flight displays and aural alerts, then presents recommended corrective action(s) to the flight crew to decide on the best course of action using Crew Resource Management (CRM).

Figure 3:
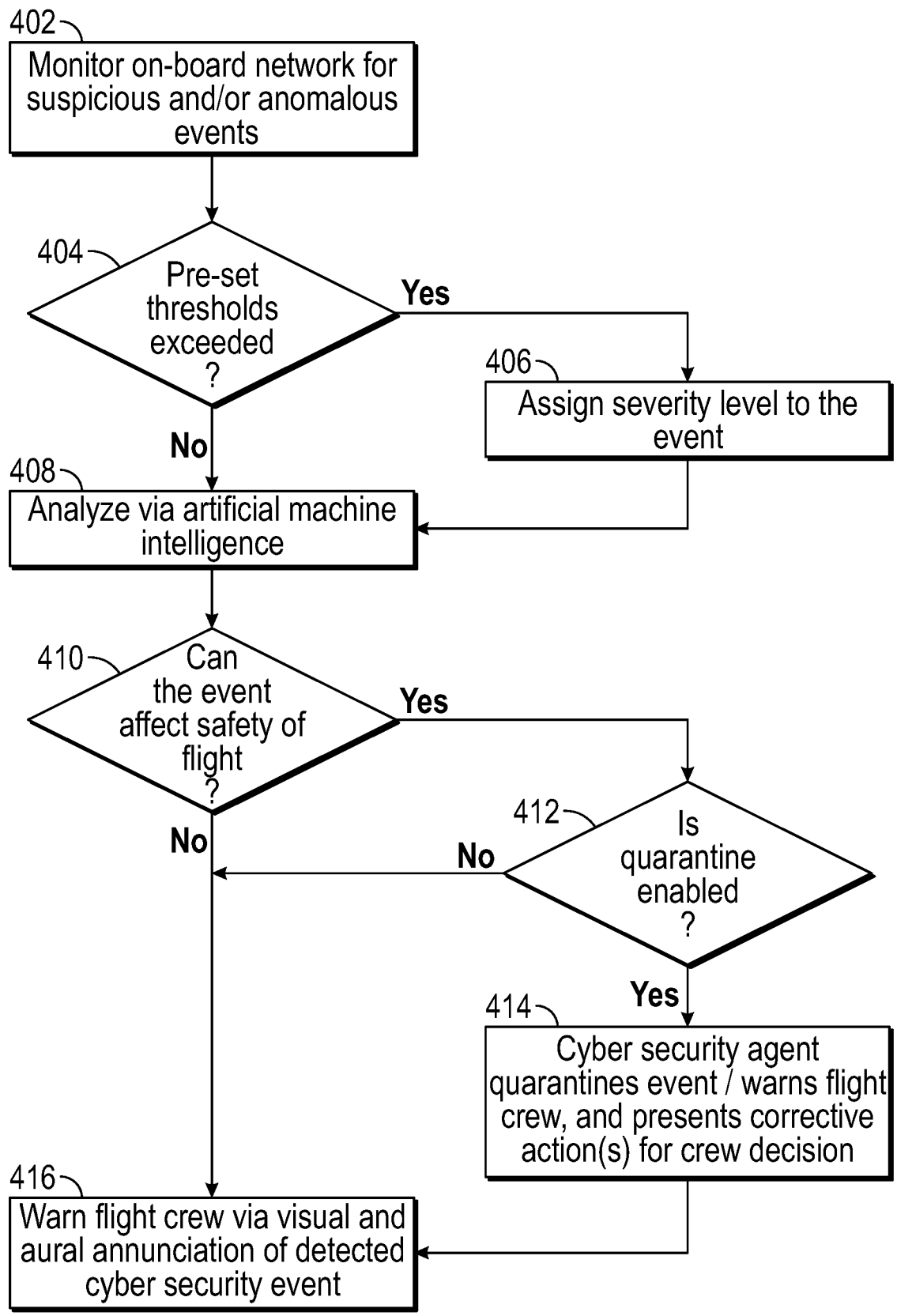
FIG. 3 presents the logic tree System 200 uses for detecting and responding to cyber security events and network anomalies.

System 200 using artificial intelligence/machine intelligence (AI/MI) and advanced machine learning continues to learn from network activity and crew decisions what is normal and what is abnormal, thus allowing for continuous improvement in detection accuracy and recommended corrective actions. FIG. 3 depicts System 200 monitoring all network activity and data from switches in Network A and Network B as end systems and devices transmit and receive data through the switches.

System 200 stores all network A and network B activity for 30 days or 720 hours of continuous aircraft operation. This data can be offloaded from System 200 via System 320 where the network activity can be analyzed and played back to assist cyber security personnel in understand attack vectors, targets, sources of attack, methods used, impact of events, non-cyber-attack network anomalies and to perform post event forensics and analysis If System 200, Step 412 software selectable quarantine function is disabled, Module 210 does not quarantine any network activity, but continues to warn the flight crew of the detected cyber security events or network anomaly and recommend corrective action for the flight crew to decide on the best course of action using Crew Resource Management (CRM).

The flight crew and maintenance personnel will interact with System 200 through available aircraft Human Interface Devices (HID) to include, but not limited to touchscreens, track ball and joy stick pointing devices and switches, keyboards, tablets, Electronics Flight Bags (EFB), smart phones and/or verbally using human speech in English. A goal for future embodiments of the present disclosure is for two way (full duplex) human voice interactions in English with System 200 and any combination of the aforementioned HID devices.

The data loader for System 200 shall be in a secure location onboard the aircraft and only accessed as needed by personnel properly trained on FAA Advisory Circular AC-119 Aircraft Network Security Program following the software chain of custody and other procedures as described in AC-119. The data download and maintenance interface capabilities of System 320 will follow similar guidelines regarding physical and software security of the data.

System 200 is comprised of; a housing(s) and power supply(s), mother board(s), network interface card(s), microprocessor(s), Solid State Drive(s) (SSD), Random Access Memory (RAM), Read Only Memory (ROM), Electronically Programmable Read Only Memory (EPROM), operating system, keyboard and pointing device interface(s) and interfaces for any other HID device available onboard the aircraft, software, firmware, Basic Input Output Subroutines (BIOS), applications, algorithms and any other programmable code and/or hardware necessary to accomplish the objectives of the present disclosure.

System 200 will comprise of two independent network monitors; one for Network A and one for Network B whether residing in a single physical housing or two separate housings each will have the components described in the previous paragraph. In addition, System 200 will incorporate a third element having all the components described in the previous paragraph and will act as a system comparator using artificial intelligence/machine intelligence (AI/MI) to evaluate any differences in detected events on Network A and Network B. The comparator will also act as the final authority as to what warnings (both aural and visual) and corrective actions are presented to the flight crew or ground support personnel while the aircraft is in flight and/or on the ground.

The flight crew accessible kill switch Component 220 between System 200 and aircraft power is intended to allow the flight crew to quickly power off System 200 in the event of safety or control of flight situation, when the flight crew may need to employ unusual flight control inputs in a effort to recover or stabilize control of the aircraft. E.g. during an aerodynamic stall, flat spin or other loss of control of the aircraft event.

Prior art systems and methods incorporate and rely upon a datalink system to transmit data to a ground based system and requires transition of data back to the aircraft. This system and method are flawed due to the ease of a cyber attacker to compromise the datalink terminal on-board the aircraft and does not meet the full scope and intentions of the National Institute of Standards and Technology (NIST) cyber security standards and best practices. Conversely, the system and method described in the present disclosure does meet the NIST requirements to Detect, Respond and Recover without the need for transmitting or receiving any data on or off the aircraft.

Other implementations of the present disclosure may become apparent and are included in the scope of the disclosure herein. Furthermore, the specific terms contained in the present disclosure are used for the purpose of describing the invention and are not for the purposes of limitation.

The present invention accordingly provides a system and method for monitoring, detecting, warning and optionally quarantining cyber security events and network or device anomalies on-board aircraft while in flight and/or on the ground and provides post event network and device data download capabilities for forensics and further analysis.

Thus, while there are shown and described fundamental novel features of the invention as applied to preferred embodiments thereof, it will be understood that various omissions, substitutions and changes in the form and details of the methods described and systems illustrated, and in their operation, may be made by those skilled in the art without departing from the spirit of the invention. For example, it is expressly intended that all combinations of those elements and/or method steps, which perform substantially the same function in substantially the same way to achieve the same results, be within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A cyber security detection and alert system for monitoring, detecting, and warning cyber security events on aircraft networks, comprising:
 a cyber security system physically deposed on-board an aircraft using advanced machine learning, the cyber security system including a processor, memory, operating system, and network interface, the memory including operations that when executed by the processor, cause the operating system to:
  load normal aircraft operating parameters and thresholds, including a network map of devices that include switches, end points, and access points;
  learn what aircraft operating parameters and thresholds are considered normal both inflight and on ground, including learning which devices communicate with each other, at what frequency the devices communicate with each other, and during what phase of flight the devices communicate with each other;

monitor all network devices for network activity data and sending the network activity data in real time to the cyber security detection and alert system;

analyze the network activity data for cyber security events and determine if normal operating parameters or pre-set thresholds have been exceeded; and warn flight operators and recommend corrective action, wherein the system monitors all network devices, analyzes the network activity data, and warns flight operators and recommends corrective action without transmitting or receiving any data on or off the aircraft;

access a quarantine system, wherein when the quarantine system is enabled, the system quarantines the detected cyber security event, warns a flight crew via visual and aural annunciations, and implements one or more corrective actions;

wherein the system is a two mode system with a ground mode that prioritizes network activities associated with ground operations and an air mode that prioritizes network activities associated with flight safety and aircraft control.

2. The system of claim 1, wherein the cyber security detection and alert system monitors the on-board aircraft networks for suspicious or anomalous events.

3. The system of claim 1, wherein cyber security detection and alert system includes a kill switch component that enables an operator to quickly power off the cyber security detection and alert system in an emergency safety or flight control situation.

4. The system of claim 1, wherein the cyber security detection and alert system does not include transmissions with any ground-based system to implement cybersecurity detection.

5. A method of monitoring, detecting, and warning of cyber security events on aircraft networks using a cyber security detection and alert system, comprising:

accessing an on-board cyber security system using advanced machine learning, the cyber security system including a processor, memory, operating system, and network interface, the memory including operations that when executed by the processor, cause the operating system to:

loading normal aircraft operating parameters and thresholds, including a network map of devices that include switches, end points, and access points;

learning what aircraft operating parameters and thresholds are considered normal both inflight and on ground, including learning which devices communicate with each other, at what frequency the devices communicate with each other, and during what phase of flight the devices communicate with each other;

monitoring all network devices for network activity data and sending the network activity data in real time to the cyber security detection and alert system;

analyzing the network activity data for cyber security events and determine if normal operating parameters or pre-set thresholds have been exceeded;

warning flight operators and recommend corrective action, wherein the system monitors all network devices, analyzes the network activity data, and warns flight operators and recommends corrective action without transmitting or receiving any data on or off the aircraft; and accessing a quarantine system, wherein when the quarantine system is not enabled, the system warns the flight crew via visual and aural annunciations of detected cyber security events, but does not implement one or more corrective actions;

wherein the system is a two mode system with a ground mode that prioritizes network activities associated with ground operations and an air mode that prioritizes network activities associated with flight safety and aircraft control.

6. The method of claim 5, further comprising: monitoring the on-board aircraft networks for suspicious or anomalous events.

7. The method of claim 5, further comprising: providing a kill switch component that enables an operator to quickly power off the cyber security detection and alert system in an emergency safety or flight control situation.

8. The method of claim 5, wherein the cyber security detection and alert system does not include transmissions with any ground-based system to implement cybersecurity detection.

9. A cyber security detection and mitigation system for monitoring, detecting, and warning cyber security events on aircraft networks, comprising:

a cyber security system physically deposed on-board an aircraft using advanced machine learning, the cyber security system including a processor, memory, operating system, and network interface, the memory including operations that when executed by the processor, cause the operating system to:

load normal aircraft operating parameters and thresholds, including a network map of devices that include switches, end points, and access points;

learn what aircraft operating parameters and thresholds are considered normal both inflight and on ground, including learning which devices communicate with each other, at what frequency the devices communicate with each other, and during what phase of flight the devices communicate with each other;

monitor all network devices for network activity data and sending the network activity data in real time to the cyber security detection and mitigation system;

analyze the network activity data for cyber security events and determine if normal operating parameters or pre-set thresholds have been exceeded;

access a quarantine system, wherein when the quarantine system is enabled, the system quarantines the detected cyber security event, and warns a flight crew via visual and aural annunciations; and implement one or more suggested corrective actions including quarantining the cyber security events occurring on-board the aircraft while in flight, wherein the system monitors all network devices, analyzes the network activity data, and implements one or more suggested corrective actions without transmitting or receiving any data on or off the aircraft.

10. A method of monitoring, detecting, and warning of cyber security events on aircraft networks using a cyber security detection and mitigation system, comprising:

accessing an on-board cyber security system using advanced machine learning, the cyber security system including a processor, memory, operating system, and network interface, the memory including operations that when executed by the processor, cause the operating system to:

loading normal aircraft operating parameters and thresholds, including a network map of devices that include switches, end points, and access points;

learning what aircraft operating parameters and thresholds are considered normal both inflight and on ground, including learning which devices communicate with each other, at what frequency the devices communicate with each other, and during what phase of flight the devices communicate with each other;

monitoring all network devices for network activity data and sending the network activity data in real time to the cyber security detection and mitigation system;

analyzing the network activity data for cyber security events and determine if normal operating parameters or pre-set thresholds have been exceeded; and accessing a quarantine system, wherein when the quarantine system is not enabled, the system warns the flight crew via visual and aural annunciations of detected cyber security events, but does not implement one or more corrective actions;

wherein the system monitors all network devices, analyzes the network activity data, and implements one or more suggested corrective actions without transmitting or receiving any data on or off the aircraft.

11. The system of claim 1, wherein the cyber security detection and alert system includes two independent network monitoring systems, one network monitoring system for Network A that receives all network traffic and one network monitoring system for Network B that also receives all network traffic, and wherein the cyber security detection and alert system further includes a system comparator that evaluates any differences in detected events on Network A and Network B, and acts as a final authority as to what warnings, corrective actions, or both are presented to the operator.

12. The method of claim 5, wherein the cyber security detection and alert system includes two independent network monitoring systems, one network monitoring system for Network A that receives all network traffic and one network monitoring system for Network B that also receives all network traffic, and wherein the cyber security detection and alert system further includes a system comparator that evaluates any differences in detected events on Network A and Network B, and acts as a final authority as to what warnings, corrective actions, or both are presented to the operator.

13. The system of claim 9, wherein the cyber security detection and alert system includes two independent network monitoring systems, one network monitoring system for Network A that receives all network traffic and one network monitoring system for Network B that also receives all network traffic, and wherein the cyber security detection and alert system further includes a system comparator that evaluates any differences in detected events on Network A and Network B, and acts as a final authority as to what warnings, corrective actions, or both are presented to the operator.

14. The method of claim 10, wherein the cyber security detection and alert system includes two independent network monitoring systems, one network monitoring system for Network A that receives all network traffic and one network monitoring system for Network B that also receives all network traffic, and wherein the cyber security detection and alert system further includes a system comparator that evaluates any differences in detected events on Network A and Network B, and acts as a final authority as to what warnings, corrective actions, or both are presented to the operator.

* * * * *